United States Patent
Kong et al.

(10) Patent No.: US 9,556,313 B2
(45) Date of Patent: Jan. 31, 2017

(54) VINYL CARBOSILOXANE RESINS

(71) Applicants: HENKEL IP & HOLDING GMBH, Duesseldorf (DE); HENKEL AG & CO. KGAA, Duesseldorf (DE)

(72) Inventors: Shengqian Kong, Hillsborough, NJ (US); Liwei Zhang, Shanghai (CN); Yong Zhang, Shanghai (CN); Wentao Thomas Xing, Shanghai (CN); Daniel J. Duffy, Naperville, IL (US)

(73) Assignees: Henkel AG & Co. KGaA, Duesseldorf (DE); Henkel IP & Holding GmbH, Duesseldorf (DE)

( * ) Notice: Subject to any disclaimer, the term of this patent is extended or adjusted under 35 U.S.C. 154(b) by 0 days.

(21) Appl. No.: 14/562,872

(22) Filed: Dec. 8, 2014

(65) Prior Publication Data
US 2015/0087791 A1 Mar. 26, 2015

Related U.S. Application Data

(63) Continuation of application No. PCT/CN2012/076509, filed on Jun. 6, 2012.

(51) Int. Cl.
| | | |
|---|---|---|
| C08G 77/20 | (2006.01) | |
| C08L 83/14 | (2006.01) | |
| C08G 77/38 | (2006.01) | |
| C08G 77/50 | (2006.01) | |
| C08G 77/12 | (2006.01) | |
| C08G 77/04 | (2006.01) | |

(52) U.S. Cl.
CPC ........... *C08G 77/20* (2013.01); *C08G 77/38* (2013.01); *C08G 77/50* (2013.01); *C08L 83/14* (2013.01); *C08G 77/045* (2013.01); *C08G 77/12* (2013.01)

(58) Field of Classification Search
CPC ......... C08G 77/12; C08G 77/20; C08L 43/04; C08F 230/08
USPC .............................................. 528/31, 32, 37
See application file for complete search history.

(56) References Cited

U.S. PATENT DOCUMENTS

| | | | |
|---|---|---|---|
| 3,438,936 A * | 4/1969 | Lamoreaux | C08G 77/50 528/15 |
| 5,656,710 A | 8/1997 | Newberth, III et al. | |
| 2002/0091193 A1* | 7/2002 | Halloran | C08G 77/06 524/588 |
| 2010/0179283 A1* | 7/2010 | Sueyoshi et al. | 524/858 |
| 2010/0225010 A1 | 9/2010 | Katayama | |

OTHER PUBLICATIONS

International Search Report for International Application No. PCT/CN2012/076509 dated Mar. 14, 2013.

* cited by examiner

*Primary Examiner* — Kuo-Liang Peng
(74) *Attorney, Agent, or Firm* — James E. Piotrowski

(57) ABSTRACT

This invention is a vinylcarbosiloxane resin that is the hydrosilation reaction product of 1,3,5,7-tetravinyl-1,3,5,7-tetramethylcyclotetrasiloxane and a hydride-terminated linear polysiloxane, siloxane, or silane, having two terminal Si—H hydrogens reactive with vinyl groups in a hydrosilation reaction, in the presence of a platinum catalyst. Suitable hydride-terminated linear polysiloxanes, siloxances, and silanes include those having the structures:

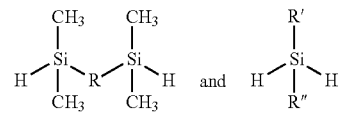

In another embodiment, the vinylcarbosiloxane resin can be reacted with one or more other hydrido-silanes and hydrido-polysiloxanes in the presence of a platinum catalyst to form a curable composition.

9 Claims, No Drawings

VINYL CARBOSILOXANE RESINS

BACKGROUND

This invention relates to vinyl carbosiloxane resins and to their use as encapsulants, particularly for LED devices.

High power light-emitting-diodes (LEDs) are gaining momentum as a replacement for incandescent and fluorescent lamps for retail use, architectural illumination, automotive use, and street lighting. Heat resistant polymers and/or polymer composites are used as encapsulant materials, and are known to maintain mechanical properties (modulus, elongation, toughness, adhesive strength) under thermal aging conditions. These are important for LED applications, but without good optical transparency under continuous usage, the polymers are unsuitable.

Traditionally, epoxies have been the preferred encapsulants for LED encapsulation because they have low moisture permeability, high refractive index, high hardness, and low thermal expansion. Nevertheless, epoxies turn yellow after exposure to photon fluxes and temperatures at about 100° C. Due to high electricity consumption, LEDs can reach operating temperatures as high as 150° C.; consequently, light output from LEDs is significantly affected when epoxies are used.

Silicone based materials are known to withstand high temperature and photon bombardment without developing yellow coloration. However, for high brightness LED encapsulation, most commercially available silicones cannot provide the hardness needed for this application. Hardness is needed both for protection of the LED semiconductors and for optimum transparency (a soft surface holds dust more than a hard surface and affects light quality). A good silicone candidate is 1,3,5,7-tetravinyl-1,3,5,7-tetramethylcyclo-tetrasiloxane.

This cyclic tetravinyl tetrasiloxane compound provides sufficient Shore D or high Shore A hardness when cured with hydridosilicones having multiple Si—H groups, a low coefficient of thermal expansion, and good transparency, all of which are important properties for LED encapsulants. The disadvantage is that cyclic tetravinyl tetrasiloxane is volatile and can be lost from the reaction mix during final cure.

SUMMARY OF THE INVENTION

This invention relates to vinyl carbosiloxane resins, derived from 1,3,5,7-tetravinyl-1,3,5,7-tetramethylcyclo-tetrasiloxane, and their use as components of encapsulants, particularly for LED devices. The term "encapsulant", within this specification and the claims, is deemed to include coatings, adhesives, and molding compounds.

In one embodiment, this invention is a vinyl carbosiloxane resin that is the reaction product of the vinyl groups on the compound 1,3,5,7-tetravinyl-1,3,5,7-tetramethylcyclo-tetra-siloxane with the terminal Si—H hydrogens on a hydride-terminated linear polysiloxane, siloxane, or silane, having two terminal Si—H hydrogens reactive with vinyl groups in a hydrosilation reaction, in the presence of a platinum catalyst.

In another embodiment, this invention is a curable composition prepared from the reaction of the vinyl carbosiloxane resin with one or more other hydridosilicones in the presence of a platinum catalyst.

DETAILED DESCRIPTION OF THE INVENTION

Within this specification and the claims, the following terms shall have the meanings noted:

D4V refers to the compound 1,3,5,7-tetravinyl-1,3,5,7-tetramethylcyclotetrasiloxane (a cyclic tetravinyl tetrasiloxane, available from Gelest).

Di—Si—H refers to a hydride-terminated linear polysiloxane, siloxane, or silane, having two terminal Si—H hydrogens reactive with vinyl groups in a hydrosilation reaction.

DMS-H03 refers to, and is the product number of, a hydride-terminated polydimethylsiloxane (a di-Si—H) (available from Gelest).

DVTMDS refers to divinyltetramethyldisiloxane (a chain extender) (available from Gelest).

HMS-301 refers to, and is the product number of, a methylhydrosiloxane-dimethylsiloxane copolymer (an hydridosilicone) (available from Gelest).

HPM-502 refers to, and is the product number of, a methylhydrosiloxane-phenylmethylsiloxane copolymer (an hydridosilicone) (available from Gelest).

PDMS refers to polydimethyl siloxane.

Pt cat refers to a platinum catalyst. The catalyst used in the examples in this specification contains 2.0-2.3% platinum concentration in cyclic methylvinylsiloxanes (available as product number SIP6832.2 from Gelest). Other platinum catalysts are known and commercially available, and will have similar activity and efficiency.

TMDS refers to tetramethyldisiloxane (a di-Si—H) (available from Gelest).

VCSR refers to a vinylcarbosiioxane resin prepared from D4V and di-Si—H, with or without a chain extender.

The vinyl carbosiloxane resins of this invention are prepared from the hydrosilation reaction of one or more of the vinyl groups on D4V with an Si—H hydrogen on a di-Si—H compound.

D4V, that is, 1,3,5,7-tetravinyl-1,3,5,7-tetramethylcyclo-tetrasiloxane, has the structure:

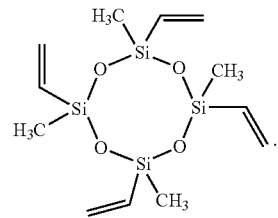 [SMILES: C=C[Si]1(C)O[Si](C)(C=C)O[Si](C)(C=C)O[Si](C)(C=C)O1]

The di-Si—H compounds suitable for reacting with D4V are selected from those having the structures:

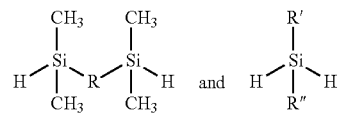

in which R is a $C_1$ to $C_4$ alkyl group or an aryl group; an oxygen; or a linear silicone unit of the structure —(O—SiMe$_2$)$_n$ or —(O—SiAr$_2$)$_n$ or —(O—SiMeAr)$_n$ in which n is at least the numeral one and represents the number of repeating units (determined by molecular weight); Me is a methyl group; Ar is an aryl group; and R' and R" independently are a $C_1$ to $C_4$ alkyl group or an aryl group. When R is an alkyl group or an aryl group, the di-Si—H compound is a silane; when R is an oxygen, the di-Si—H compound is a siloxane; when R is a linear silicone, the di-Si—H compound is a poly-siloxane.

In some embodiments, a chain extender can be used to extend di-Si—H compounds and increase the molecular weight of the VCSRs. Suitable chain extenders are selected from am-vinyl terminated linear polysiloxanes, divinyl silanes, and divinyl siloxanes. An example of a chain extender is divinyltetramethyldisiloxane.

The preferred VCSRs are prepared from the D4V and di-Si—H compounds in a molar ratio of 1.2 or greater. At this molar ratio or greater, gellation is avoided. When chain extenders are used in the reaction blend to extend a di-Si—H compound, the molar ratio is calculated on the available moles of D4V and di-Si—H after the chain extension. The following equations illustrate the calculations:

moles di-Si—H–moles chain extender=available moles di-Si—H.

[(moles $D4V$–available moles di-Si—H) available moles di-Si—H]×100%=% excess $D4V$.

moles $D4V$ available moles di-Si—H=molar ratio of $D4V$ to di-Si—H.

Within this specification and the claims, molar ratio shall mean the molar ratio of D4V to available di-Si—H.

When used with nano-size fillers, the molecular weight (weight average) of the desired VCSR is designed optimally to be within the range of approximately 800 to approximately 2000 because within this molecular weight range, the vinyl carbosiloxane resins are not volatile, and yet are small enough to provide a molecular coil size that is smaller than a nano-scale filler particle size. This allows the vinyl carbosiloxane resin particles, when formulated in a composition containing a nano-size filler, to inhabit the interspatial areas of the filler and prevent agglomeration of the filler.

The catalyst for the hydrosilation reactions to form the VCSRs is typically a platinum. The preferred catalyst is a liquid platinum catalyst. When optical clarity is desired, the catalyst is used at a level to be 20 ppm or less in the final resin. Higher levels can cause yellowing, but can be used as needed when it is not required to avoid yellowing. In many reactions, the level of catalyst can still be active and yet be low enough so that it is not necessary to separate it from the carbosiloxane product.

The following are depictions of the reaction schemes using D4V and a di-Si—H compound.

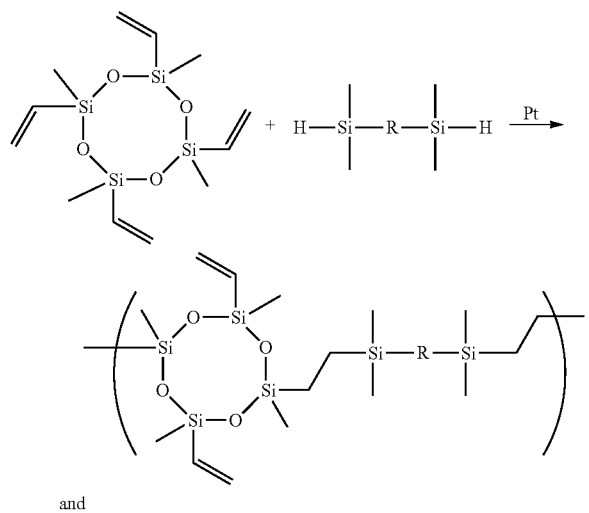

and

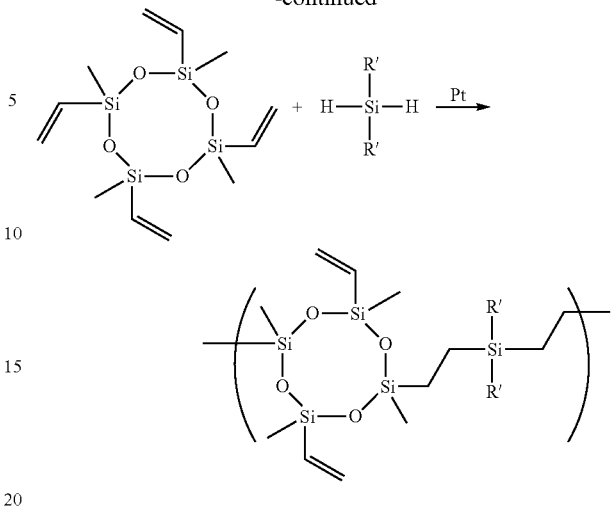

In these depictions only two vinyl groups on the D4V are reacted, but it is expected that there will be varying degrees of substitution of the vinyl groups on the D4V resin so that the product will be a mixture of vinylcarbosiloxanes. In practice, the molar ratio of D4V to di-Si—H is chosen so that the VCSR reaction product has at least one remaining unreacted vinyl group, which will be used in a subsequent curing reaction.

In a further embodiment of this invention, these VCSRs can be reacted with hydrido-silanes and/or hydrido-polysiloxanes in the presence of a platinum catalyst to form curable compositions, such as can be used as encapsulants or sealants. Suitable hydrido-polysiloxanes and hydrido-silanes are commercially available from, for example, Gelest, Dow Corning, Momentive, and Shin Etsu.

Fillers can be added to the curable compositions as required by the end use application; for example, fillers can be added to impart desired performance characteristics, such as thixotropy or conductivity.

Although fillers are not required for the curable compositions of this invention to be used as encapsulants for LEDs, when fillers are incorporated for LED applications in which optical transparency is required, the fillers preferably will be nano-scale. For other applications in which optical transparency is not required, micro-scale particles can be used as fillers. When micro-scale particles are used, it is possible to formulate with vinylcarbosiloxane resins having a weight average molecular weight of greater than 2000. In such a case, the practitioner can determine the appropriate molecular suitable for the end use.

In most case, when the curable composition will be used in a context requiring optical transparency, the practitioner matches the refractive index of the filler to the refractive index of the cured composition.

Suitable fillers can be conductive or non-conductive fillers. Examples of conductive fillers are carbon black, graphite, gold, silver, copper, platinum, palladium, nickel, aluminum, silicon carbide, boron nitride, diamond, and alumina. Examples of nonconductive fillers are vermiculite, mica, wollastonite, calcium carbonate, titania, sand, glass, fused silica, fumed silica, barium sulfate, tetrafluoroethylene, trifluoroethylene, vinylidene fluoride, vinyl fluoride, vinylidene chloride, and vinyl chloride. When present, fillers will be in amounts of 0.1% to 90% by weight of the formulation, the weight depending on the function and performance of the filler as determined by the practioner.

EXAMPLES

Example 1

Syntheses for Vinylcarbosiloxane Resins Using D4V, TMDS (Di-Si—H), and DVTMDS Chain Extender VCSR-1A to VCSR-1 D were prepared from the reaction of D4V with TMDS in the presence of platinum catalyst. DVTMDS was used as a chain extender for the TMDS.

Table 1-1 summarizes the amount of the reactants for the four VCSRs. In addition to the reactants listed, toluene was used as a solvent in the amount of 34.25 g and the Pt catalyst was used in the amount of 0.06 g, for each reaction. DVTMDS was used as a chain extender for the TMDS in a one to one ratio. Table 1-2 summarizes the molar ratio of D4V to the TMDS available for further reaction after some of the starting TMDS is consumed in the chain extension with DVTMDS. The calculations (in which the letters in parentheses represent the columns, and "avl" means "available") were made as follows:

moles TMDS ($W$)–moles DVTMDS ($V$)=avl TMDS ($X$)

[(moles $D4V$ ($U$)–avl moles TMDS ($X$))÷avl moles TMDS ($X$)]×100%=% excess $D4V$ ($Y$)

moles $D4V$ ($U$) avl moles TMDS ($X$)=molar ratio of $D4V$ to TMDS ($Z$).

TABLE 1-1

| Example Number | U D4V Mw = 344.66 wt (g) | moles | V DVTMDS Mw = 186.4 wt (g) | moles | W TMDS Mw = 134.32 wt (g) | moles |
|---|---|---|---|---|---|---|
| VCSR-1A | 103.5 | 0.30 | 0 | 0.00 | 33.5 | 0.25 |
| VCSR-1B | 77.5 | 0.22 | 13.98 | 0.08 | 33.5 | 0.25 |
| VCSR-1C | 51.75 | 0.15 | 27.96 | 0.15 | 33.5 | 0.25 |
| VCSR-1D | 25.85 | 0.08 | 41.94 | 0.23 | 33.5 | 0.25 |

TABLE 1-2

| Example Number | X Available TMDS moles | Y % Excess D4V | Z Molar Ratio D4V to TMDS |
|---|---|---|---|
| VCSR-1A | 0.25 | 20% | 1.20:1 |
| VCSR-1B | 0.17 | 29% | 1.29:1 |
| VCSR-1C | 0.10 | 51% | 1.51:1 |
| VCSR-1D | 0.02 | 207% | 3.07:1 |

The syntheses of the vinylcarbosiloxane resins VCSR-1A to VCSR-1 D were carried out as follows:

VCSR-1A: Into a 500 mL dry and clean round bottom flask were added 0.06 g platinum catalyst SIP 6832.2, 103.50 g D4V and 34.25 g toluene. A magnetic stirrer was added and the flask was capped with a stopper and a condenser. The solution was stirred for 15 min at room temperature to ensure complete dissolution of the catalyst. Next, 33.50 g TMDS was added drop by drop over 30 minutes at 65° C. After adding TMDS, the reaction was heated to 75° C. and held at that temperature for two hours. The reaction then was heated to 120° C. and held at that temperature for four hours. The total solution was distilled by rotary evaporation at 105° C. and 20 mbar for one hour, and then at 135° C. and five mbar for another hour.

VCSR-1 B: Into a 500 mL dry and clean round bottom flask were added 0.06 g platinum catalyst, 77.50 g D4V, 13.98 g DVTMDS and 34.25 g toluene. A magnetic stirrer was added and the flask was capped with a stopper and a condenser. The solution was stirred for 15 minutes at room temperature to ensure complete dissolution of the catalyst. Next, 33.50 g TMDS was added drop by drop over 30 minutes at 65° C. After adding TMDS, the reaction was heated to 75° C. and held at that temperature for two hours. The reaction then was heated to 120° C. and held at that temperature for four hours. The total solution was distilled by rotary evaporation at 105° C. and 20 mbar for one hour, and then at 135° C. and five mbar for another hour.

VCSR-1C: Into a 500 mL dry and clean round bottom flask were added 0.06 g platinum catalyst, 51.75 g D4V, 27.96 g DVTMDS and 34.25 g toluene. A magnetic stirrer was added and the flask was capped with a stopper and a condenser. The solution was stirred for 15 minutes at room temperature to ensure complete dissolution of the catalyst. Next, 33.50 g TMDS was added drop by drop over 30 minutes at 65° C. After adding TMDS, the reaction was heated to 75° C. and held at that temperature for two hours. The reaction then was heated to 120° C. and held at that temperature for four hours. The total solution was distilled by rotary evaporation at 105° C. and 20 mbar for one hours and then at 135° C. and five mbar for another hour.

VCSR-1 D: Into a 500 mL dry and clean round bottom flask was added 0.06 g platinum catalyst, 25.85 g D4V, 41.94 g DVTMDS and 34.25 g toluene. A magnetic stirrer was added and the flask was capped with a stopper and a condenser. The solution was stirred for 15 minutes at room temperature to ensure complete dissolution of the catalyst. Next, 33.50 g TMDS was added drop by drop over 30 minutes at 65° C. After adding TMDS, the reaction heated to 75° C. and held at that temperature for two hours. The reaction then was heated to 120° C. and held at that temperature for four hours. The total solution was distilled by rotary evaporation at 105° C. and 20 mbar for one hour and then at 135° C. and five mbar for another hour.

These resins did not gel and remained stable for months, changing only upon being subjected to cure conditions (such as set out in Example 2).

Additional properties are summarized in Table 1-3.

TABLE 1-3

| Sample ID | Vinyl Content (mmol/g) | Viscosity (CP) | Mw | Refractive Index | Appearance |
|---|---|---|---|---|---|
| VCSR-1A | 4.76 | 2158 | 67696 | 1.4543 | Clear |
| VCSR-1B | 4.06 | 1280 | 40322 | not tested | Clear |
| VCSR-1C | 3.10 | 1024 | 37756 | not tested | Clear |
| VCSR-1D | 1.85 | 384 | 10926 | not tested | Clear |

Example 2

Preparation and Properties of Curable Compositions Containing VCSR-1A to -1D with HMS-301 Hydridosilicone In this example, the vinylcarbosiloxanes prepared in Example 1 were mixed with the hydridosilicone HMS-301 to form curable compositions, denoted CC. Curable composition CC-1A was prepared using VCSR-1A; the remaining curable compositions were prepared likewise from the corresponding VCSRs from Example 1. All compositions were prepared in the ratio of vinyl group to Si—H hydrogen of 1:1.5. All compositions were mixed by speedmixer, degassed, and cured at 150° C. for two hours.

The percent transparency (T %) at 400 nm, both initially and after aging at 150° C. for 1000 hours, and the Shore A hardness for the compositions CC-1A to CC-1 D were measured. A Shore A hardness of greater than 70, and a transparency of at least 70%, and more preferably 85% or greater, is acceptable for use in LED electronics. The results are recorded in Table 2.

TABLE 2

| Sample ID | Hardness (Shore A) | Initial T % at 400 nm | T % at 400 nm after aging 150° C. for 1000 h |
|---|---|---|---|
| CC-2A | 90 | 92.20% | 91.03% |
| CC-2B | 89 | 91.05% | 86.46% |
| CC-2C | 82 | 90.06% | 86.78% |
| CC-2D | 75 | 90.15% | 87.64% |

Example 3

Determination of Workable Molar Ratio of D4V to TMDS

This example demonstrates that a molar ratio of D4V to TMDS of less than 1.2. results in products that undergo gelation. Compositions were prepared similarly as described in Example 1 except that no chain extender and no solvent were used. The amounts and molar ratios reported in Table 3 were used. Calculations were made as described in Example 1.

TABLE 3

| Reaction blend | D4V Mw = 344.66 wt (g) | moles | TMDS Mw = 134.32 wt (g) | moles | Molar Ratio D4V:TMDS |
|---|---|---|---|---|---|
| 3A | 9.30 | 0.027 | 4.04 | 0.030 | 0.9:1 |
| 3B | 9.82 | 0.028 | 4.03 | 0.030 | 0.93:1 |
| 3C | 68.94 | 0.200 | 26.86 | 0.200 | 1.0:1 |
| 3D | 10.86 | 0.031 | 4.03 | 0.030 | 1.03:1 |
| 3E | 11.37 | 0.033 | 4.03 | 0.030 | 1.10:1 |
| 3F | 19.81 | 0.057 | 6.70 | 0.049 | 1.15:1 |
| 3G | 2.07 | 0.006 | 0.67 | 0.005 | 1.2:1 |
| 3H | 2.24 | 0.006 | 0.67 | 0.005 | 1.3:1 |
| 3J | 2.59 | 0.007 | 0.67 | 0.005 | 1.5:1 |
| 3K | 2.93 | 0.008 | 0.67 | 0.005 | 1.7:1 |
| 3L | 3.45 | 0.011 | 0.67 | 0.005 | 2.0:1 |
| 3M | 3.45 | 0.011 | 0.34 | 0.0025 | 4.0:1 |

Reaction blends 3A to 3E were prepared and held at room temperature. Within a month at room temperature, reaction blends 3A, 3B and 3C gelled, and reaction blends 3D and 3E increased in viscosity and gelled within three months.

The seven reaction blends 3F to 3M were prepared by heating at 70° C. for four hours, followed by heating at 90° C. for 70 hours. Reaction blend 3F gelled within 64 hours. The reaction blends 3G, 3H, 3J, 3K, 3L, and 3M did not gel. These results indicate that a molar ratio of D4V to TMDS of 1.2 or greater result in products that do not gel. This is consistent with the results of the samples in Example 1.

Example 4

Synthesis for Vinylcarbosiloxane Resin Using D4V and DMS-H03 (Di-Si—H); Preparation and Properties of Curable Compositions Using the Resulting VCSR with HMS-301

VCSR-2A: Into a 250 mL dry and clean round bottom flask were added 0.012 g platinum catalyst, 10.32 g D4V and 21.57 g xylene. A magnetic stirrer was added and the flask was capped with a stopper and a condenser. The solution was stirred for 15 minutes at room temperature to ensure complete dissolution of the catalyst. Next, 11.25 g DMS-H03 was added drop by drop over 30 minutes at 65° C. After adding DMS-H03, the reaction was held at 75° C. for two hours. The reaction then was heated to 120° C. and held at that temperature for four hours. The total solution was distilled by rotary evaporation at 105° C. and 20 mbar for one hour, and then at 135° C. and five mbar for another hour. The product was clear in appearance, had a weight average Mw of 17161, a viscosity of 128 mPa·s at room temperature, and a vinyl content of 2.95 mmol/g.

CC-2A. VCSR-2A was mixed with HMS-301 in a ratio of vinyl groups to Si—H hydrogens of 1:1.5. The mixing was performed by speedmixer, degassed, and cured at 150° C. for two hours. The Shore A hardness and the percent transparency (T %) at 400 nm, both initially and after aging at 150° C. for 1000 hours, were measured and the results recorded in Table 4.

TABLE 4

| Sample ID | Hardness (Shore A) | Initial T % at 400 nm | T % at 400 nm after aging 150° C. for 1000 h |
|---|---|---|---|
| Sample CC-2A | 81 | 89.59% | 88.51% |

Example 5

Syntheses for Vinylcarbosiloxane Resins Using D4V, Diphenyl Silane (Di-Si—H), and DVTMDS Chain Extender VCSR-3A to VCSR-3D were prepared from the reaction of D4V with diphenyl silane (di-Si—H) in the presence of platinum catalyst. DVTMDS was used as a chain extender for the diphenyl silane. Table 5-1 summarizes the reactants.

TABLE 5-1

| Sample ID | D4V (g) | DVTMDS (g) | Diphenylsilane (g) | Xylene (g) | Pt cat (g) |
|---|---|---|---|---|---|
| VCSR-3A | 20.64 | 0 | 9.22 | 3.14 | 0.008 |
| VCSR-3B | 15.50 | 2.79 | 9.22 | 6.28 | 0.024 |
| VCSR-3C | 10.34 | 5.59 | 9.22 | 6.28 | 0.024 |
| VCSR-3D | 5.17 | 8.34 | 9.22 | 6.28 | 0.016 |

VCSR-3A: Into a 100 mL dry and clean round bottom flask were added 0.008 g platinum catalyst SIP 6832.2, 20.64 g D4V, 9.22 g diphenylsilane and 3.14 g xylene. A magnetic stirrer was added and the flask was capped with a stopper and a condenser. The reaction heated to 75° C. and held at that temperature for one hour. The reaction then was heated to 130° C. and held at that temperature for six hours. The total solution was distilled by rotary evaporation at 115° C. and 20 mbar for one hour, and then 135° C. and five mbar for another hour.

VCSR-3B: Into a 100 mL dry and clean round bottom flask were added 0.024 g platinum catalyst, 15.50 g D4V, 2.79 g DVTMDS, 9.22 g diphenylsilane and 6.28 g xylene. A magnetic stirrer was added and the flask was capped with a stopper and a condenser. The reaction heated to 75° C. and held at that temperature for one hour. The reaction then was heated to 130° C. and held at that temperature for six hours. The total solution was distilled by rotary evaporation at 115° C. and 20 mbar for one hour, and then at 135° C. and five mbar for another hour.

VCSR-3C: Into a 100 mL dry and clean round bottom flask were added 0.024 g platinum catalyst, 10.34 g D4V, 5.59 g DVTMDS, 9.22 g diphenylsilane and 6.28 g xylene. A magnetic stirrer was added and the flask was capped with a stopper and a condenser. The reaction was heated to 75° C. and held at that temperature for one hour. The reaction then was heated to 130° C. and held at that temperature for six hours. The total solution was distilled by rotary evaporation at 115° C. and 20 mbar for one hour, and then at 135° C. and five mbar for another hour.

VCSR-3D: Into a 100 mL dry and clean round bottom flask were added 0.016 g platinum catalyst, 5.17 g D4V, 8.34 g DVTMDS, 9.22 g diphenylsilane and 6.28 g xylene. A magnetic stirrer was added and the flask was capped with a stopper and a condenser. The reaction was heated to 75° C. and held at that temperature for one hour. The reaction then was heated to 130° C. and held at that temperature for six hours. The total solution was distilled by rotary evaporation at 115° C. and 20 mbar for one hour, and then at 135° C. and five mbar for another hour.

Properties of the resultant resins were tested and are summarized in Table 5-2.

TABLE 5-2

| Sample ID | Vinyl Content (mmol/g) | Viscosity (mPa · s) | Wt average Mw | Refractive Index |
| --- | --- | --- | --- | --- |
| VCSR-3A | 4.69 | 1600 | 2246 | — |
| VCSR-3B | 4.0 | 5120 | 2793 | — |
| VCSR-3C | 3.18 | 25600 | 5750 | 1.5339 |
| VCSR-3D | 2.20 | 9856 | 2865 | 1.5432 |

Example 6

Preparation and Properties of Curable Compositions Containing VCSR-3A to -3D with HPM-502 Hydridosilicone In this example, the vinylcarbosiloxanes prepared in Example 5 were mixed with hydridosilicone to form curable compositions (denoted CC). Curable composition CC-3A was prepared using VCSR-3A; the remaining curable compositions were prepared likewise from the corresponding VCSRs from Example 5. All compositions were prepared in a ratio of vinyl groups to Si—H hydrogens of 1:1.5. The hydridosilicone mixed with the VSCR was HPM-502, methylhydrosiloxane-dimethylsiloxane copolymer, hydride terminated. All compositions were mixed by speedrnixer, degassed, and cured at 150° C. for two hours.

The percent transparency (T %) at 400 nm, both initially and after aging at 150° C. for 1000 hours, and the Shore A hardness for the compositions CC-6A to CC-6D were measured and the results recorded in Table 6. A Shore A hardness of greater than 70, and a transparency of at least 70%, and more preferably 85% or greater, is acceptable for use in LED electronics.

TABLE 6

| Sample ID | Hardness (Shore A) | Initial T % at 400 nm | T % at 400 nm after aging 150° C. for 1000 h |
| --- | --- | --- | --- |
| CC-3A | 89 | 91.57% | 86.18% |
| CC-3B | 85 | 92.29% | 87.29% |
| CC-3C | 84 | 89.39% | 87.18% |
| CC-3D | 82 | 89.46% | 80.68% |

Example 7

Syntheses for Vinylcarbosiloxane Resins Using D4V, Bis(dimethylsilyl)benzene (Di-Si—H) and DVTMDS as Chain Extender VCSR-4A and VCSR-4B were prepared from the reaction of D4V with DVTMDS in the presence of platinum catalyst. DVTMDS was used as a chain extender for the bis(dimethylsilyl)benzene. TABLE 7-1 summarizes the reactants.

TABLE 7-1

| Sample ID | D4V (g) | DVTMDS (g) | Bis(dimethylsilyl)-benzene (g) | Toluene (g) | Pt catalyst (g) |
| --- | --- | --- | --- | --- | --- |
| VCSR-4A | 5.17 | 2.80 | 4.86 | 3.14 | 0.003 |
| VCSR-4B | 2.58 | 4.19 | 4.86 | 3.14 | 0.003 |

VCSR-4A: Into a 100 mL dry and clean round bottom flask were added 0.003 g platinum catalyst, 5.17 g D4V, 2.80 g DVTMDS, 4.86 g bis(dimethylsilyl)-benzene and 3.14 g toluene. A magnetic stirrer was added and the flask was capped with a stopper and a condenser. The reaction was heated to 75° C. and held at that temperature for one hour, after which the reaction was heated to 120° C. and held at that temperature for three hours. The total solution was distilled by rotary evaporation at 115° C. and 20 mbar for one hour, and then at 135° C. and five mbar for another hour.

VCSR-4B: Into a 100 mL dry and clean round bottom flask was added 0.003 g platinum catalyst 2.58 g D4V, 4.19 g DVTMDS, 4.86 g bis(dimethylsilyl)benzene and 3.14 g toluene. A magnetic stirrer was added and the flask was capped with a stopper and a condenser. The reaction was heated to 75° C. and held at that temperature for five hours, after which the reaction was heated to 120° C. and held at that temperature for two hours. The total solution was distilled by rotary evaporation at 115° C. and 20 mbar for one hour, and then at 135° C. and five mbar for another hour.

Example 8

Synthesis for Vinylcarbosiloxane Resins Using D4V and TMDS Dimer

VCSR-5A: To a 250 mL 3-neck round bottom flask were added 0.050 g platinum catalyst, 500 g (1.45 moles) V4D resin (0.298 moles, 102.63 g needed for reaction), stirred using overhead stirrer. A condenser was used to prevent loss of TMDS. The reaction was warmed to 70° C., then 20 g (0.149moles) TMDS was slowly added (no reflux noted). The molar ratio of D4V to TMDS was 9.7:1. The reaction temperature was increased to 90° C. and held at that temperature for two hours, followed by an increase to 120° C. and held at that temperature for two hours. Then excess D4V was removed by distillation (430 g collected). The remainder was subjected to solvent removal by a Kugelrohr at 110°

C./150 microns, and an additional 11.8 g were collected, giving a total of 61.26 g product collected, about a 50% yield.

The variation in the ratio of the vinyl groups in the VCSR to the Si—H hydrogens in the hydrido-silicone, -siloxane, or -silane will determine the ultimate properties in the cured composition, for example, degree of tackiness or hardness. The vinyl group to Si—H hydrogen ratio can be any determined by the practitioner to be suitable for the end use. For example, in a number of the examples in this specification, the sought after properties were hardness and non-yellowing, two properties desired for LED applications. The use of an excess of Si—H hydrogens helped to minimize yellowing by ensuring that all vinyl groups were reacted. Similar adjustments to the ratio of vinyl groups to Si—H hydrogens can be made to achieve diverse properties.

The invention claimed is:

1. A vinylcarbosiloxane resin that is the hydrosilation reaction product of a mixture comprising A) 1,3,5,7-tetravinyl-1,3,5,7-tetramethylcyclotetrasiloxane and B) a bis(dimethylsilyl) alkylene or a linear polysiloxane having two terminal Si—H capable of reacting with vinyl groups in a hydrosilation reaction selected from the group having the structure:

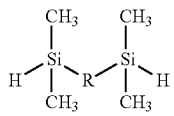

in which R is a $C_1$ to $C_4$ alkyl group or a linear silicone unit of the structure —(O—SiMe$_2$)$_n$ or —(O—SiAr$_2$)$_n$ or —(O—SiMeAr)$_n$;
in which n is 3 to 5 and represents the number of repeating units; Me is a methyl group; Ar is an aryl group; and R' and R" independently are a $C_1$ to $C_4$ alkyl group or an aryl group.

2. The vinylcarbosiloxane resin according to claim 1 wherein the molar ratio of A) 1,3,5,7-tetravinyl-1,3,5,7-tetramethylcyclotetrasiloxane to B) a bis(dimethylsilyl) alkylene or a linear polysiloxane having two terminal Si—H hydrogens capable of reacting with vinyl groups in a hydrosilation reaction is 1.2:1 or greater.

3. The vinylcarbosiloxane resin according to claim 2 that is the reaction product of A) 1,3,5,7-tetravinyl-1,3,5,7-tetramethylcyclotetrasiloxane, B) a bis(dimethylsilyl) alkylene or a linear polysiloxane having two terminal Si—H capable of reacting with vinyl groups in a hydrosilation reaction, and a chain extender.

4. The vinylcarbosiloxane resin according to claim 3 in which the chain extender is selected from the group consisting of α, ω-vinyl terminated linear polysiloxanes, divinyl silanes, and divinyl siloxanes.

5. The vinylcarbosiloxane resin according to claim 4 in which the chain extender is divinyltetramethyldisiloxane.

6. A curable composition comprising the reaction product of the vinylcarbosiloxane resin according to claim 1 and an hydrido-silane and/or an hydrido-polysiloxane in the presence of a platinum catalyst.

7. The vinylcarbosiloxane resin according to claim 1 in which R is a C1 to C4 alkyl group.

8. A vinylcarbosiloxane resin that is the hydrosilation reaction product of a mixture comprising A) 1,3,5,7-tetravinyl-1,3,5,7-tetramethylcyclotetrasiloxane and a hydride-terminated bis(dimethylsilyl) alkylene, bis(dimethylsilyl) arylene, linear polysiloxane, disiloxane, or silane, having two terminal Si—H capable of reacting with vinyl groups in a hydrosilation reaction selected from the group having the structures:

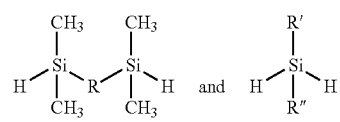

in which R is a $C_1$ to $C_4$ alkyl group or an aryl group; an oxygen; or a linear silicone unit of the structure —(O—SiMe$_2$)$_n$ or —(O—SiAr$_2$)$_n$ or —(O—SiMeAr)$_n$;
in which n is 1 to 5 and represents the number of repeating units; Me is a methyl group; Ar is an aryl group; and R' and R" independently are a $C_1$ to $C_4$ alkyl group or an aryl group;
wherein the vinylcarbosiloxane resin has a weight average molecular weight of 800 to 2800.

9. A vinylcarbosiloxane resin that is the hydrosilation reaction product of a mixture comprising A) 1,3,5,7-tetravinyl-1,3,5,7-tetramethylcyclotetrasiloxane and a hydride-terminated bis(dimethylsilyl) alkylene, bis(dimethylsilyl) arylene, linear polysiloxane, disiloxane, or silane, having two terminal Si—H capable of reacting with vinyl groups in a hydrosilation reaction selected from the group having the structures:

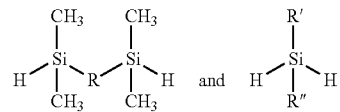

in which R is a $C_1$ to $C_4$ alkyl group or an aryl group; an oxygen; or a linear silicone unit of the structure —(O—SiMe$_2$)n or —(O—SiAr$_2$)$_n$ or —(O—SiMeAr)n;
in which n is 1 to 5 and represents the number of repeating units; Me is a methyl group; Ar is an aryl group; and R' and R" independently are a $C_1$ to $C_4$ alkyl group or an aryl group;
wherein the molar ratio of A) 1,3,5,7-tetravinyl-1,3,5,7-tetramethylcyclotetrasiloxane to a hydride-terminated bis(dimethylsilyl) alkylene, bis(dimethylsilyl) arylene, linear polysiloxane, disiloxane , or silane, having two terminal Si—H hydrogens capable of reacting with vinyl groups in a hydrosilation reaction is 1.5:1 or greater.

* * * * *

UNITED STATES PATENT AND TRADEMARK OFFICE
CERTIFICATE OF CORRECTION

PATENT NO. : 9,556,313 B2
APPLICATION NO. : 14/562872
DATED : January 31, 2017
INVENTOR(S) : Shengqian Kong et al.

It is certified that error appears in the above-identified patent and that said Letters Patent is hereby corrected as shown below:

In the Specification

Column 2, Line 28: Change "vinylcarbosiioxane" to -- vinylcarbosiloxane --.

Column 3, Line 4: Change "am-vinyl" to -- $\alpha,\omega$- vinyl --.

Column 5, Line 30: After "D4V (U)", insert -- ÷ --.

Signed and Sealed this
Fifth Day of December, 2017

Joseph Matal
*Performing the Functions and Duties of the*
*Under Secretary of Commerce for Intellectual Property and*
*Director of the United States Patent and Trademark Office*